United States Patent
Arrizabalaga et al.

(10) Patent No.: US 9,153,059 B2
(45) Date of Patent: Oct. 6, 2015

(54) METHOD FOR SETTING A SYSTEM FOR PROJECTING AN IMAGE ONTO A RELIEF PROJECTION SURFACE

(71) Applicant: Commissariat a l'energie atomique et aux energies alternatives, Paris (FR)

(72) Inventors: Gorka Arrizabalaga, Lans en Vercors (FR); Jean-Francois Mainguet, Grenoble (FR)

(73) Assignee: Commissariat á l'énergie atomique et aux énergies alternatives, Paris (FR)

( * ) Notice: Subject to any disclaimer, the term of this patent is extended or adjusted under 35 U.S.C. 154(b) by 377 days.

(21) Appl. No.: 13/713,925

(22) Filed: Dec. 13, 2012

(65) Prior Publication Data

US 2013/0155060 A1    Jun. 20, 2013

(30) Foreign Application Priority Data

Dec. 16, 2011    (FR) ..................... 11 61798

(51) Int. Cl.
*G06T 15/00*    (2011.01)
*G06T 7/00*    (2006.01)
(Continued)

(52) U.S. Cl.
CPC .............. *G06T 15/00* (2013.01); *G06T 7/0028* (2013.01); *G06T 7/0042* (2013.01); *H04N 9/3185* (2013.01); *H04N 9/3194* (2013.01); *H04N 13/0459* (2013.01); *G06T 2200/04* (2013.01)

(58) Field of Classification Search
CPC ...... G03B 21/60; G03B 21/606; G01B 11/25; G01B 11/028; G01B 11/2513; G02B 27/0103; G02B 6/4224; G06T 19/006; H04N 13/0459; G03H 2001/043; G03H 2210/562
USPC ......................................... 345/419
See application file for complete search history.

(56) References Cited

U.S. PATENT DOCUMENTS

| | | |
|---|---|---|
| 2003/0034976 A1 | 2/2003 | Raskar et al. |
| 2005/0017924 A1 | 1/2005 | Utt et al. |
| 2009/0245691 A1* | 10/2009 | Naimark et al. ............. 382/285 |

FOREIGN PATENT DOCUMENTS

WO    2010/102288    9/2010

OTHER PUBLICATIONS

Delaunay et al., Towards Retro-projected Robot Faces: an Alternative to Mechatronic and Android Faces, The 18th IEEE International Symposium on Robot and Human Interactive Communication, 2009, pp. 306-311.*

(Continued)

*Primary Examiner* — Kee M Tung
*Assistant Examiner* — Haixia Du
(74) *Attorney, Agent, or Firm* — Occhiuti & Rohlicek LLP

(57) ABSTRACT

A method for displaying an image onto a relief projection surface using a projection system includes the automatic measurement, using a fixed camera, of the distance separating virtual reference frame points projected onto the projection surface, from real reference frame points produced on a three-dimensional screen to set the projection system, acquisition, by the same fixed camera as that used during the setting of the projection system, of an image of a rear face of the three-dimensional screen, identification of the position of a finger in contact with a front face of the three-dimensional screen in the acquired image, and control of an appliance according to the identified position of the finger.

21 Claims, 2 Drawing Sheets

(51) Int. Cl.
*H04N 13/04* (2006.01)
*H04N 9/31* (2006.01)

(56) References Cited

OTHER PUBLICATIONS

J.C. Verlinden, A. de Smit, A.W.J. Peeters, M.H. Van Gelderen, "Development of flexible augmented prototyping systems," Delft University of technology, Journal of WSCG, vol. 11, No. 1, ISSN 1213-6972, Feb. 2003.

Ramesh Raskar et al, "Shader Lamps: Animating Real Objects with Image-Based Illumination," Proceedings of the Eurographics Workshop on Rendering, Jun. 25, 2001, pp. 1-10.

Morishima S et Al, "Hypermask: Talking head projected onto moving surface," Proceedings 2001 International Conference On Image Processing, vol. 3, Oct. 7, 2001, pp. 947-950.

Piper B et Al, "Illuminating Clay: A 3-D Tangible Interface for Landscape Analysis," CHI 2002 Conference Proceedings. Conference on Human Factors in Computing Systems. Apr. 20, 2002, pp. 355-362.

Bennett E et Al, "The effect That Touching a Projection Augmented Model Has on Object-Presence," Information Visualisation, 2005. Proceedings, Ninth International Conference On, Jul. 6, 2005, pp. 790-795.

Frederic Delaunay et Al, "A study of a retro-projected robotic face and its effectiveness for gaze reading by humans," Human-Robot Interaction (HRI), 2010 5th ACM/IEEE International Conference On, Mar. 2, 2010, pp. 39-44.

Hrvoje Benko, Andrew D. Wilson, Patrick Baudisch: "Precise Selection Techniques for multi-touch screens," ACM, Apr. 22, 2006, pp. 1263-1272.

\* cited by examiner

METHOD FOR SETTING A SYSTEM FOR PROJECTING AN IMAGE ONTO A RELIEF PROJECTION SURFACE

CROSS-REFERENCE TO RELEATED APPLICATIONS

Under 35 USC 119, this application claims the benefit of the priority date of French Patent Application 1161798, filed Dec. 16, 2011, the content of which is herein incorporated by reference.

BACKGROUND

The invention relates to a method for setting a system for projecting an image onto a relief projection surface. Another subject of the invention is a method for displaying an image on this relief projection surface and a system for displaying a three-dimensional image. Finally, also the subject of the invention is an information storage medium for the implementation of the preceding methods.

A "relief" projection surface here describes a surface which is not contained in a plane. Such a relief surface therefore has bumps or hollows, the depth or the height of which relative to a median plane is at least greater than 5 mm and, typically, greater than 1 cm or 5 cm. The median plane is the plane which minimizes the sum of the heights and depths of all the reliefs of the projection surface. Typically, such a projection surface is dished so as to be primarily concave or convex. This projection surface is borne by a three-dimensional screen.

The term "three-dimensional" describes an object or a surface for which, regardless of the reference frame considered, the position of each point of this object or of this surface is defined unambiguously by three coordinates x, y and z along three non-coplanar axes of this reference frame, none of these coordinates being a constant.

The systems for displaying an image on a relief projection surface have in particular been developed to allow for the rapid production of prototypes. For example, such a system is described in the following article:

J. C. Verlinden, A. de Smit, A. W. J. Peeters, M. H. Van Gelderen, « Development of flexible augmented prototyping systems », Delft University of technology.

As indicated in this article, one of the difficulties is that it is difficult to set the display system so that the projected image which is in two dimensions, is displayed correctly on the relief surface. More specifically, the difficulty stems from the fact that the image has to be projected very precisely so that the pixels of the image in two dimensions designed to illuminate a particular relief pattern of the three-dimensional screen actually illuminate this particular pattern and not another area of the three-dimensional screen.

Various setting methods have been developed. Most of these methods are manual and therefore take time.

The applicant has also considered an automatic setting method consisting in measuring, using an instrument, the position of the three-dimensional screen relative to the projector to then be able to compute the relationship which links each pixel of the image in two dimensions to a relief of the three-dimensional screen. This method entails knowing very accurately the position of the projector in relation to the position of the instrument for measuring the position of the screen. Now, in practice, it is not easy to fairly accurately position the measuring instrument relative to the projector.

Moreover, it is desirable to enable a user, in the simplest possible way, to select a particular position on the projection surface to automatically trigger, in response, an action.

Prior art is also known from:
Ramesh Raskar et al, « Shader Lamps: Animating Real Objects with Image-Based Illumination », Proceedings of the Eurographics Workshop on Rendering, 25 Jun. 2001, pages 1-10,
Morishima S et Al, « Hypermask: Talking head projected onto moving surface », Proceedings 2001 International Conference On Image Processing, vol. 3, 7 Oct. 2001, pages 947-950,
PIPER B et Al, « Illuminating Clay: A 3-D Tangible Interface For Landscape Analysis », CHI 2002 Conference Proceedings. Conference on Human Factors in Computing Systems. 20 Apr. 2002, pages 355-362,
WO2010/102288A2,
Bennett E et Al, « The effect That Touching a Projection Augmented Model Has on Object-Presence », Information Visualisation, 2005. Proceedings, Ninth International Conference On, 6 Jul. 2005, pages 790-795,
FREDERIC DELAUNAY et Al, « A study of a retro-projected robotic face and its effectiveness for gaze reading by humans », Human-Robot Interaction (HRI), 2010 5th ACM/IEEE International Conference On, 2 Mar. 2010, pages 39-44,
HRVOJE BENKO, ANDREW D. WILSON, PATRICK BAUDISCH: « Precise Selection Techniques for multi-touch screens », ACM, 22 Apr. 2006, pages 1263-1272.

SUMMARY

The invention aims to remedy at least one of these drawbacks. Its subject is therefore a display method.

The above method makes it possible to automatically set the projection appliance so that the projected images then correspond as perfectly as possible to the different reliefs of the projection surface.

Furthermore, the above method does not entail knowing the position of the instrument for measuring the distance between the virtual and real points relative to the position of the projector.

The use of a three-dimensional screen made of translucent material prevents the beam from the projector from being able to be cut by a viewer.

The use of the same camera as that used during the setting of the projection system to identify the position of a finger in contact with the front face of the three-dimensional screen makes it possible to render the screen touch-sensitive while limiting the number of additional equipment items to be added.

The embodiments of these methods may comprise one or more of the features of the dependent method claims. These embodiments of the display method also offer the following advantages:
 permanently reiterating the setting during the projection of an image makes it possible to automatically adapt the projected image to a movement of the three-dimensional screen;
 the positioning of the suction holes at the positions of the virtual reference frame points makes it possible to use the bumps necessarily created by the thermoforming as real reference frame points.

Another subject of the invention is an information storage medium comprising instructions for the execution of a method according to any one of the preceding claims, when these instructions are executed by an electronic computer. Another subject of the invention is a system for displaying a three-dimensional image.

The embodiments of this display system may comprise one or more of the features of the dependent system claims.

BRIEF DESCRIPTION OF THE DRAWINGS

The invention will be better understood on reading the following description, given purely as a nonlimiting example and done by referring to the drawings in which.

In these figures, the same references are used to designate the same elements.

DETAILED DESCRIPTION

Hereinafter in this description, the features and functions well known to the person skilled in the art are not described in detail.

Figure 1:
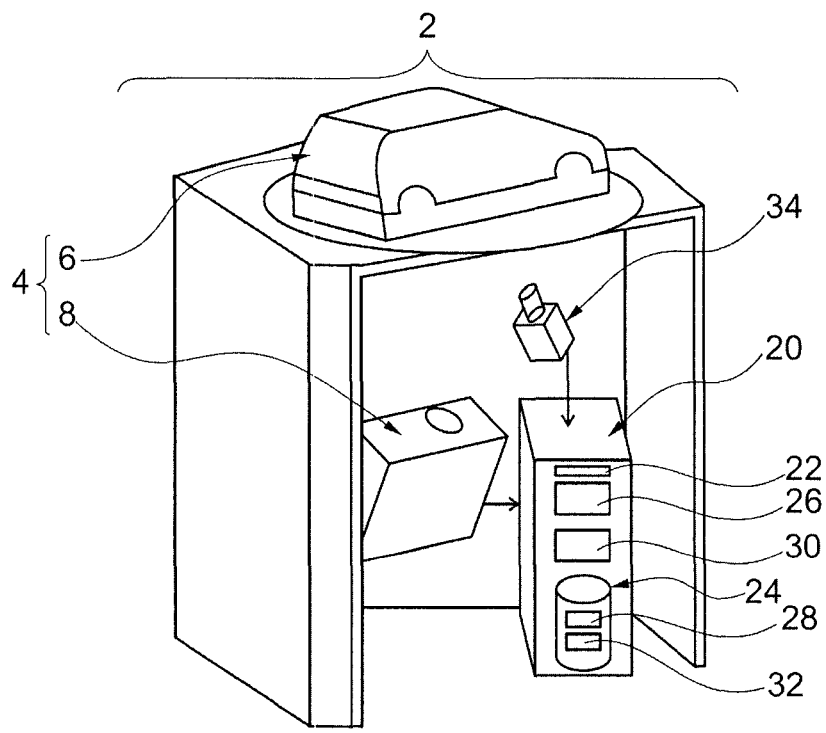
FIG. 1 is a schematic and perspective illustration of a system for displaying a three-dimensional image.

FIG. 1 represents a system 2 for displaying a three-dimensional image. The system 2 comprises a three-dimensional image projection appliance 4. Here, this appliance 4 is an overhead projector. This appliance 4 notably comprises a three-dimensional screen 6 and a two-dimensional image projector 8. A two-dimensional image is an image in which the position of each pixel is defined solely by a pair x, y of coordinates.

Figure 2:
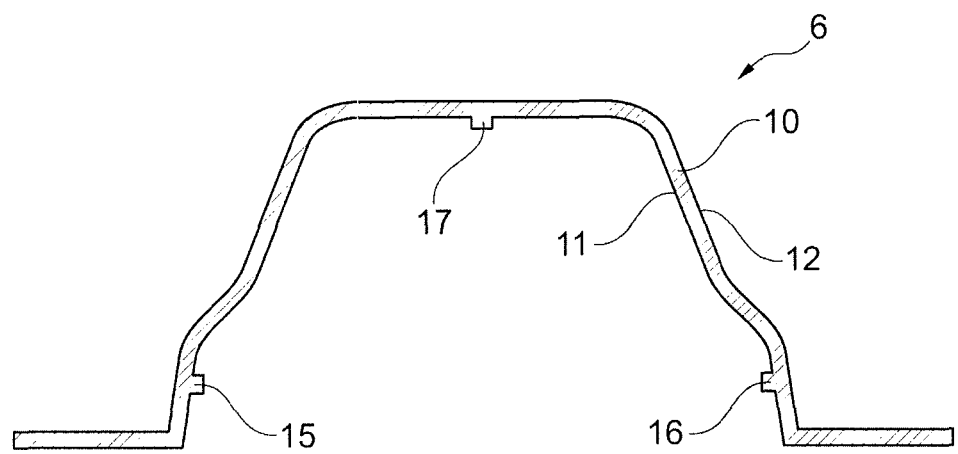
FIG. 2 is a schematic illustration in cross section of a three-dimensional screen used in the system of FIG. 1.

The screen 6 is represented in more detail in FIG. 2. The screen 6 is formed by a translucent wall 10 having an internal face 11 and an external face 12. The internal face 11 forms the relief projection surface onto which the images are directly projected.

Typically, the wall 10 is produced in a rigid material that has, for example, a Young's modulus greater than 1 GPa. For example, the material is a material such as a polymer, glass or similar. Here, this material is a thermoformable plastic such as PMMA (polymethylmethacrylate) or polycarbonate.

The thickness of the wall 10 is typically greater than 0.5 mm or 1 mm or 10 mm.

In this embodiment, the wall 10 is concave. Here, the external face 12 delimits the contouring in three dimensions of a motor vehicle.

Real reference frame points 15 to 17 are fixed with no degree of freedom on the wall 10. These points 15 to 17 are singularities of the wall that are easy to locate and identify by an appropriate measuring instrument such as a camera coupled to shape recognition software. Here, these points 15 to 17 are bumps or hollows, the height or the depth of which is greater than 0.5 mm or 1 mm and, preferably, greater than 2 or 5 mm. In this embodiment, these points 15 to 17 form only a single block of material with the wall 10. More specifically, here, the points 15 to 17 are bumps formed on the internal face 11 of the wall 10 by suction holes of a positive thermoforming mold of this wall.

The screen 6 comprises at least four and preferably more than ten real reference frame points. For example, preferably, the screen 6 comprises at least three real reference frame points for each essentially planar face of the projection surface. In FIG. 2, only three of these real reference frame 25 points have been represented.

The projector 8 is a controllable projector of images onto the projection surface. Here, this projector is placed on the side of the internal face 11 of the screen 6. Its position is fixed and known relative to the screen 6. Furthermore, some of these parameters, such as the direction of its line of sight, its projection field, are here considered to have been previously adjusted to project an image onto all of the projection surface. Here, these previously adjusted parameters are non-modifiable constants.

Figure 3:
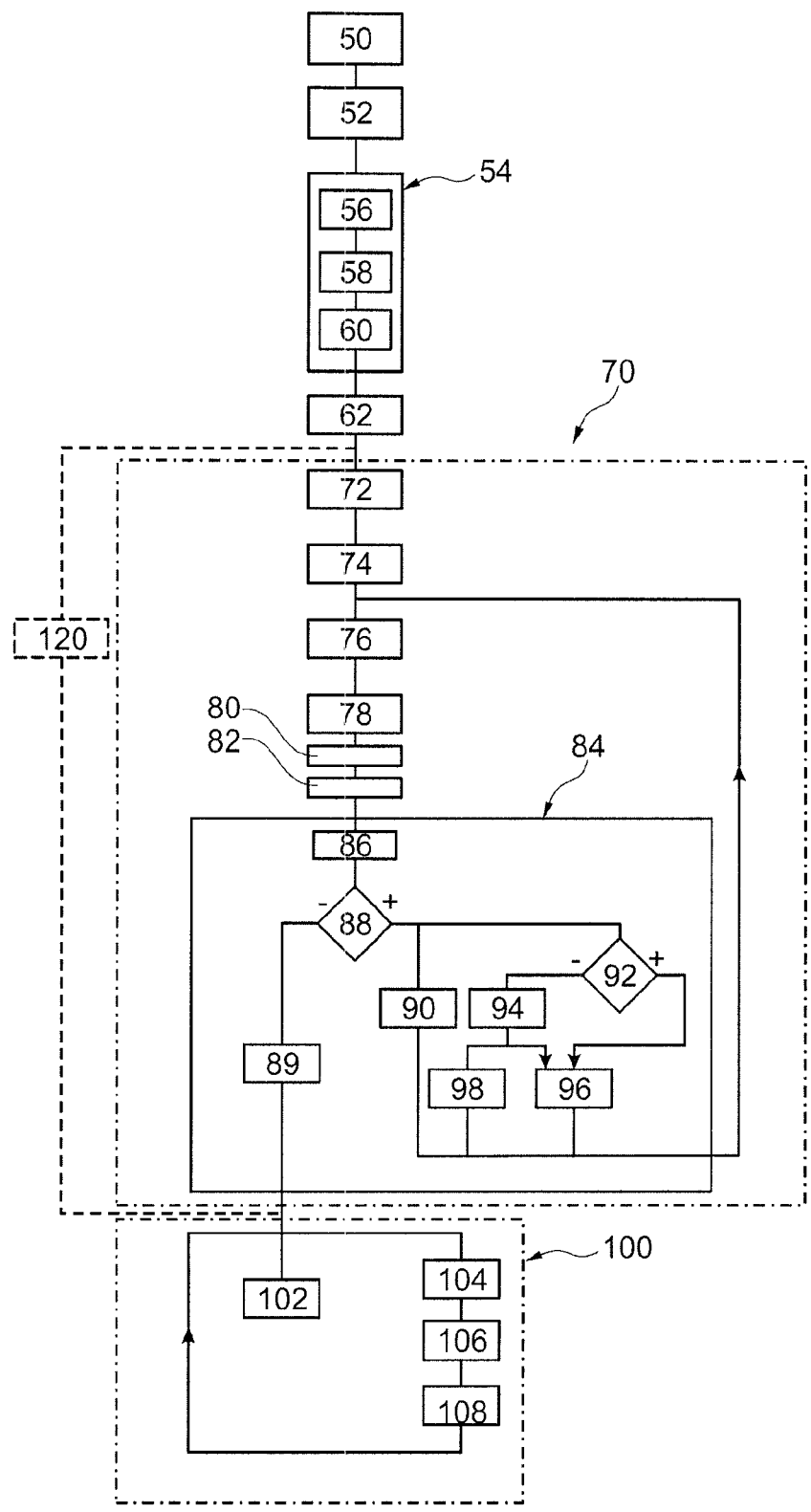
FIG. 3 is a flow diagram of a method for building, setting and using the system of FIG. 1.

The system 2 also comprises an electronic computer 20 programmed to execute the method of FIG. 3. For example, the computer 20 is a central processing unit of a computer. This computer 20 notably comprises a programmable microprocessor 22 suitable for executing instructions stored on an information storage medium. To this end, the computer 20 also comprises a memory 24 containing the instructions needed to execute the method of FIG. 3.

In this embodiment, the computer 20 notably implements a module 26 for constructing two-dimensional images to be projected by the projector 8 onto the screen 6. The module 26 constructs the two-dimensional images from a computer model of the projection surface. The constructed image is a function:

of the constant parameters such as, here, the direction of the line of sight and the projection field of the projector 8, and of parameters that can be set such as the position of the computer model in a reference frame linked with no degree of freedom to the projector 8.

To this end, the memory 24 contains a computer model 28 of the projection surface. This model defines each relief of the projection surface. For example, it is formed by a multitude of meshes that are immediately contiguous with one another, each mesh defining an individual surface or facet of the projection surface. For example, each facet is a planar individual face.

This model 28 specifies positions of virtual reference frame points on the projection surface. These virtual reference frame points are a few points out of all the points forming the projection surface. Each virtual point indicates the position of a corresponding real reference frame point on the projection surface. Here, the position of each virtual point on the model 28 is identical to the position of the corresponding real point on the projection surface. The model 28 associates with each virtual point an identifier which makes it possible to distinguish this virtual point from all the other virtual points of the model 28. For example, this identifier indicates its position such as "centre of the front right wheel", "bottom left corner of the front windscreen", etc.

The computer 20 also implements a shape recognition module 30. This module 30 is capable of recognizing, in a two-dimensional image acquired by a camera, the position of the real and virtual reference frame points. It is also suitable for recognizing a spot on the screen 6 corresponding to a finger pressing on the external face 12.

To this end, descriptions 32 of each shape to be recognized are stored in the memory 24. Here, the descriptions 32 notably comprise a description of the real reference frame points, of the virtual reference frame points and of the spots corresponding to a finger pressing on the face 12. In fact, when a viewer presses on the face 12, an overall oval shadow visible from the face 11 is formed. This shadow is here called a spot.

These descriptions of the patterns to be recognized can be constructed or learnt. For example, the description may contain the predetermined diameter of each real reference frame point and a likely height range for each of these reference frame points.

The virtual points projected onto the projection surface can take different forms. For example, they may be points of colour with a predetermined diameter. In this case, the description 32 of these projected virtual points comprises the diameter of each point as well as its characteristic colour. The virtual reference frame points can also be a particular pattern of the projected image. In this case, the description 32 comprises the characteristics that make it possible to recognize this particular pattern in a two-dimensional image. As an illustration, the virtual point may be the centre of a wheel. In this case, the description 32 may give the diameter of each wheel and each colour.

In another embodiment, these descriptions 32 are learnt. This learning consists, for example, in storing and in recognizing an image of each reference frame point and of the spot corresponding to a finger.

The module 30 is also capable of matching each real point to the corresponding virtual point in the images acquired by using the model 28.

Finally, the system 2 comprises an instrument for measuring the distance between the real reference frame points and the virtual reference frame points projected onto the projection surface. Here, the instrument comprises a camera 34 and the shape recognition module 30. The camera 34 acquires an image of the internal face 11 containing all the real reference frame points. This camera is placed on the side of the internal face 11. It is connected to the computer 20 in order to transfer the acquired images to the shape recognition module 30.

The construction, the setting and the use of the system 2 will now be described in more detail with reference to the method of FIG. 3.

In a step 50, the computer model 28 of the projection surface 11 is produced. During this step 50, the virtual reference frame points are positioned on this model 28. For example, the model 28 is produced using conventional computer-aided design (CAD) tools. Here, the model 28 is in the form of a motor vehicle. In this case, the virtual reference frame points are placed at points that are easy to identify by image processing. For example, they are the centre of the front and rear wheels, the four corners of the front and rear windscreens, etc.

Once the model 28 is completed, in a step 52, said model is saved in the memory 24. During this step 52, the descriptions 32 of the real and virtual reference frame points as well as the description of the spots formed by the pressing of a finger on the face 12 are also stored in this memory.

For example, the description 32 concerning the spots formed by the pressing of a finger on the face 12 is here produced by learning. During this learning, an image containing a grid is projected on the face 11. Then, a person presses, in a predetermined order, on each cell of this grid. Images of each of the spots created at this time are stored and form the description of the spots. Each cell or group of cells corresponds to a particular touch area. Thus, each stored image is in addition associated with an identifier of the corresponding touch area. This identifier makes it possible to identify a particular touch area out of all the touch areas defined on the projection surface.

In a step 54, the screen 6 is produced. The projection surface of this screen 6 is identical to that defined by the model 28 and the real reference frame points are placed in the same positions as the virtual reference frame points. Here, the screen 6 is produced by thermoforming. For example, in an operation 56, a mould, for example positive, of the projection surface 11 is produced from the computer model 28. This positive mould comprises suction holes in the positions of the virtual reference frame points.

In an operation 58, a thermoplastic plate is applied on to the positive mould. This plate, initially planar, is heated to be softened. Then, the softened plate is applied onto the positive mould. For this, the air between the softened plate and the positive mould is sucked through suction holes into a thermoforming machine.

Consequently, the material of the plate is sucked into each suction hole, which creates a bump on the projection surface in the position of each of these holes. These bumps form the real reference frame points on the projection surface such as the points 15 to 17 represented in FIG. 2.

Finally, in an operation 60, the thermoformed plate is stripped from the mould then made translucent. For example, the plate is made translucent by sandblasting or the deposition of a white paint on the projection surface. The screen 6 may also be made translucent by the deposition of a paint containing silver balls.

Once the screen 6 is produced, in a step 62, said screen is placed in a known position relative to the projector 8 and to the camera 34. The construction of the system 2 is completed.

A phase 70 for setting this system 2 then begins. During a step 72, the camera 34 acquires an image of the projection surface, in the absence of an image projected onto this surface by the projector 8. The acquired image is transmitted to the computer 20.

In a step 74, the transmitted image is processed by the shape recognition module 30. During this step 74, this module 30 identifies in the acquired image the real reference frame points and records their positions. To this end, it uses the prestored description 32 of these real points. Then, it associates with each identified real point the corresponding virtual point in the model 28. Here, the fact that there is only one position of the model 28 relative to the camera 34 is exploited, which makes it possible to obtain the same positions as those recorded in the acquired image. For example, the position of the model 28 is sought such that, if the model 28 was filmed by the camera 34 in this position, then that would make it possible to acquire an image of the virtual points in which these virtual points are in the same position as the real points in the acquired image. The virtual points are positioned on the model 28 in such a way that this position is unique. This position makes it possible to link each identified real point to the corresponding virtual point and therefore to the identifier of this virtual point. For each real point, this identifier of the corresponding virtual point as well as the coordinates of this real point recorded in the acquired image are then stored in the memory 24.

In a step 76, the computer constructs a two-dimensional image, containing the virtual points, from the model 28 and a value of the setting parameter. The projector 8 then projects the constructed two-dimensional image onto the projection surface. This two-dimensional image comprises a singularity or a pattern that can be recognized by the module 30 at each position of a virtual point in the two-dimensional image. Thus, an image of each virtual point is formed on the projection surface. This image of the virtual point on the projection surface is called "projected virtual point".

In a step 78, the camera 34 acquires an image of the projection surface onto which the virtual points are projected and transmits it to the shape recognition module 30.

In a step 80, the module 30 identifies, in the acquired image, the projected virtual points and records their positions. For this, it uses the prestored description 32 of the virtual reference frame points. Then, it associates, with each virtual point identified in the acquired image, the corresponding virtual point in the model 28. For example, for this, it proceeds in a manner similar to that which was described in the step 74 except that the real points are replaced by the projected virtual points. On completion of the step 80, for each virtual point identified in the acquired image, the module 30 stores its coordinates in the image associated with the identifier of the corresponding virtual point.

In a step 82, the module 30 computes, for each real point, a distance $d_i$ separating the coordinates of this real point, recorded in the step 74, and the coordinates of the corresponding projected virtual point, recorded in the step 80. The index i is the identifier of the virtual reference frame point. To identify the recorded coordinates of the corresponding projected virtual point, the module 30 uses the virtual point identifiers associated with the coordinates of the real and virtual points in the steps 74 and 80.

Then, in a step 84, an algorithm for correcting the value of the setting parameter of the system 2 is executed so as to find a new value making it possible to limit the distances $d_i$.

For example, in an operation 86, the computer 20 computes the sum of all the distances $d_i$ computed in the step 82 to obtain a total difference Δ.

In an operation 88, this total difference Δ is compared to a predetermined threshold $S_1$.

If the total difference Δ is less than the threshold $S_1$ or if all the reference frame points have already been covered by the correction algorithm, in a step 89, the computer 20 saves the last value of the setting parameter, which completes the setting phase 70. In practice, the value saved for the setting parameter is then considered to be a correct value or the best value which can be found. Otherwise, if the total difference Δ is greater than the threshold $S_1$, the value of the setting parameter is modified.

Here, during the first iteration, in an operation 90, the identifier of the virtual point for which the distance $d_i$ is the greatest is selected. Then, a new value of the setting parameter is computed to minimize this particular distance $d_i$ then the method returns to the step 76.

During subsequent iterations, in an operation 92, the computed total difference Δ is compared to the total difference Δp previously computed in the preceding iteration of the step 82.

If the difference Δp is less than the difference Δ, this means that the difference Δ has increased following the preceding modification of the value of the setting parameter. In this case, in an operation 94, the preceding value of the setting parameter is cancelled.

Then, if there is another possible and lower modification of this value which minimizes the distance $d_i$, in an operation 96, this new value of the setting parameter is retained and the method returns to the step 76.

If, however, all the possible modifications of the value of the setting parameter that make it possible to reduce the distance $d_i$ have already been tried, then, in an operation 98, the identifier of another reference frame point is selected. For example, the algorithm automatically selects the identifier of the reference frame point which, after the previously selected reference frame point, has the greatest distance $d_i$. In this operation 98, a value of the setting parameter specifically for minimizing this new distance $d_j$ is computed then the algorithm returns to the step 76.

If, in the operation 92, it is established that the new total difference Δ is less than the difference Δp, then the method proceeds directly to the operation 96. The steps 76 to 84 are thus reiterated until a satisfactory value of the setting parameter is found. Advantageously, a counter makes it possible to stop the reiteration of the steps 76 to 84 if no satisfactory value is found. Once this value is found, the setting phase is completed and a phase 100 of use of the system 2 then follows.

During the phase 100, and more specifically during a step 102, a two-dimensional image is constructed then projected onto the projection surface. This two-dimensional image is constructed from the model 28, for example, by defining and by applying colours and/or textures for some of the facets of this model then by projecting the duly coloured and/or textured model onto a plane according to the value of the setting parameter retained in order to obtain the two-dimensional image to be projected.

Thus, the projected image is perfectly matched to the projection surface and makes it possible to accurately colour or texture some of its reliefs. For example, the parts of the image corresponding to the wheels and to the front windscreen are projected onto the reliefs of the projection surface conformed, respectively, in wheel and front windscreen form.

In parallel, in a step 104, the camera 34 acquires an image of the projection surface and transmits it to the shape recognition module 30.

In a step 106, the module 30 identifies in the acquired image whether there is a spot corresponding to the position of a finger on the face 12 of the screen 6 and records the coordinates of this spot in the image. For this, it uses the descriptions 32. Here, each description 32 of a spot is associated with an identifier of a touch area. Thus, the description 32 which has the best correlation with the acquired image of the spot also makes it possible to determine the identifier of the touch area on which the viewer has pressed.

In response to the identification of the presence of a finger on the face 12, in a step 108, the computer 20 automatically controls an appliance to perform an action. Typically, this action depends on the determined identifier of the touch area. For example, a press on the bonnet of the vehicle triggers an action that is different from a press on the boot lid of this same vehicle. The action may be a modification of the projected image such as, for example, a change of colour or of texture. If no spot is identified, the step 108 is not executed.

The steps 104 to 108 are reiterated in a loop.

If the screen cannot be moved or is rarely moved, the setting of the display system is not reiterated on each projection. For example, the phase 70 is triggered manually. Conversely, in another embodiment, if the screen 6 is likely to be moved during the projection, then the setting phase 70 is reiterated in a loop in parallel with a phase 120 of use (in chain-dotted lines in FIG. 3). The phase 100 of use is then replaced by the phase 120. In this case, the virtual points are singularities of the projected image that can be automatically recognized by the module 30 such as the centre of the wheels.

Many other embodiments are possible. For example, the camera may be situated on the same side of the screen as that where the viewer is located. In this case, preferably, the real reference frame points are formed on the external face 12 of the screen 6.

Similarly, the projector 8 may be situated on the side of the face 12. In this latter case, it no longer forms, with the screen 6, an overhead projector, but a simple projection appliance. It is then no longer necessary for the wall 10 of the screen 6 to be translucent. On the contrary, the face 12 which then forms the projection surface is produced in such a way as to be reflecting.

Depending on the complexity of the form of the screen 6, a number of cameras and/or a number of projectors are used to film, respectively project, on each part of this screen.

The wall of the screen 6 can be produced in a transparent material which is then made translucent by treatments such as sandblasting, the deposition of a white paint or of silver microballs. The wall 10 can also be directly produced in a translucent material.

The screen 6 may be produced by methods other than thermomoulding. For example, it may be produced by machining a block of material. In this case, the model 28 comprises instructions for carrying out the machining operations forming the real reference frame points. It may also be produced by forming glass on a negative or positive mould, deposition of resin that can be hardened on a positive or negative mould, moulding by material injection, by plastic flow, by blowing or by rotor moulding. In each case, the mould comprises specific marks to form the real reference frame points in the positions provided by the virtual reference frame points.

The real reference frame point is not necessarily introduced deliberately on the screen. For example, it may also be a singularity of the screen that is easily identifiable, such as the end of a point, the summit of a pyramid, or similar. However, even in this case, the model 28 comprises an identifier of the corresponding virtual point.

The real reference frame points may also be hollows or holes formed in the wall of the screen and opening onto the projection surface. For example, the real reference frame point may have the form of a cross situated at the position of the virtual reference frame point.

The reference frame points may also be produced by paint marks deposited on the projection surface. Preferably, the paint used is invisible to the naked eye and only perceptible through the measuring instrument. For example the paint is only visible at wavelengths outside the visible spectrum.

The measurement of the position of the real reference frame points can be done with instruments other than a camera. For example, the real reference frame points are produced by magnets incorporated in the wall of the screen 6 exactly at the position indicated by the virtual reference frame points. The position of the real reference frame points can then be obtained by using one or more triaxial magnetic field sensors.

Graphic singularities other than a point of particular colour can be used to mark the position of the virtual points projected onto the projection surface. For example, instead of a point, a cross or another form that can easily be identified by a measuring instrument is used. The singularity marking the position of the projected virtual points may also be a function of the projected image. For example, in the case of an image of a motor vehicle, the singularities are the centres of each wheel and the four corners of the front windscreen. In this latter case, it is not necessary to use a particular colour to mark these singularities. However, even in this case, the model 28 comprises an identifier of the corresponding virtual point.

As a variant, the acquisition of the image of the real points is performed at the same time as the acquisition of the image of the virtual points projected onto the projection surface.

The display system may comprise parameters that can be set other than the orientation of the computer model relative to the line of sight of the projector. For example, as a variant, the projection field or the direction of the line of sight of the projector are parameters that can automatically be set by the computer and whose value must be determined at the time of setting.

The association of the real points identified in the acquired image and the identifier of the corresponding virtual point can be performed differently. For example, each real point has a form which is specific to it and which can be recognized by the module 30. A table associates each of these forms with an identifier of the corresponding virtual point. When the module 30 recognizes a form, it determines the identifier of the virtual point to be associated with this real point from this table. It is possible to proceed in the same manner with the projected virtual points.

Other algorithms for correcting the setting parameters are possible. For example, the algorithm may select the real point for which the aim is to minimize the distance $d_i$ not according to the computed value of this distance but, instead or in addition, according to the position of this real point relative to the other reference frame point.

The instrument for measuring the distance $d_i$ and the one for detecting a press oE a finger of the viewer on the screen may be different. For example, the camera 34 is only used to measure the distance $d_i$ whereas an infrared camera is used to detect the pressing of the finger of the viewer on the face 12.

Other methods are possible for associating the position of a finger detected on the screen with an identifier of a touch area. For example, the model 28 may also be used to identify the touch area on which the viewer has pressed. To this end, the position of the spot relative to the virtual or real points can be used.

In another variant, the touch area on which the viewer presses is identified by emitting a wave, for example an acoustic wave, in the wall 10 of the screen 6 and by measuring the variation of this wave according to the touch area on which the finger rests.

The invention claimed is:

1. A method for displaying an image onto a relief projection surface using a projection system, the method comprising setting the projection system to obtain and save a value of a setting parameter thereof, defining one of colors and textures for individual facets of a computer model defining the relief projection surface, constructing an image to be projected according to the computer model, to at least one of the colors and textures defined for the individual facets, and to the saved value for the setting parameter, and projecting the constructed image onto a projection surface of a three dimensional screen produced in a translucent material, the screen comprising a front face on which the projected image is displayed and a rear face forming the projection surface, wherein setting the projection system comprises automatically measuring, using a fixed camera, a distance separating virtual reference frame points projected onto the projection surface from real reference frame points produced on the three-dimensional screen, the method further comprising acquiring, using the fixed camera, an image of the rear face of the three-dimensional screen, identifying a position of a finger in contact with the front face of the three-dimensional screen in the acquired image, and controlling an appliance according to the identified position of the finger; wherein setting the projection system comprises saving a computer model defining the relief projection surface and positions of at least four virtual reference frame points on the projection surface, producing the three-dimensional screen comprising the projection surface defined by the computer model and the real reference frame points fixed with no degree of freedom on the projection surface at the positions of the virtual reference frame points defined by the computer model, constructing an image containing the virtual reference frame points based at least in part on the computer model and a value chosen for the setting parameter of the projection system, using a projector, projecting the constructed image onto the projection surface, automatically measuring the distance separating, on the projection surface, the projected virtual reference frame points from the real reference frame points, if the measured distance is greater than a predetermined threshold, automatically modifying the value of the setting parameter to reduce the distance and reiteration of the constructing step, the projection step, the automatic measurement step, and the automatic modification step, and if the measured distance is less than the predetermined threshold, saving the value of the setting parameter for use in a subsequent projection of an image onto the projection surface.

2. The method of claim 1, wherein the setting parameter corresponds to the position of the computer model in a reference frame linked with no degree of freedom to the projector.

3. The method of claim 1, wherein the image constructed according to the computer model has no virtual reference frame points.

4. A non-transitory and tangible information storage medium comprising instructions for execution of a method according to claim 1, the instructions being configured for execution by an electronic computer.

5. An apparatus for displaying a three-dimensional image, the apparatus comprising a projector suitable for projecting an image onto a relief projection surface, an electronic memory containing a computer model defining the relief projection surface and positions of at least four virtual reference frame points on the relief projection surface, a three-dimensional screen produced in a translucent material, the screen comprising a front face on which is displayed the projected image and a rear face forming the projection surface, and real reference frame points that are fixed, with no degree of freedom, on the projection surface at the positions of the virtual reference frame points defined by the computer model, and an electronic computer programmed to construct an image containing the virtual reference frame points based at least in part on the computer model and a value chosen for at least one parameter of the projection system that can be set, and to control the projection of the constructed image onto the projection surface, by the projector, an electronic measuring instrument for measuring a distance separating, on the projection surface, the projected virtual reference frame points from the real reference frame points, the electronic measuring instrument comprising a fixed camera, and wherein the computer is further programmed for automatically setting the value of the setting parameter of the projection system according to the distance measured by the electronic instrument, acquiring, using the fixed camera, an image of the rear face of the three-dimensional screen, identifying a position of a finger in contact with the front face of the three-dimensional screen in the acquired image, and controlling an appliance according to the identified position of the finger.

6. The apparatus of claim 5, wherein the computer is further programmed to, if the measured distance is greater than a predetermined threshold, automatically modify the value of the setting parameter to reduce the distance, and to, if the measured distance is less than the predetermined threshold, save the value of the setting parameter for use in a subsequent projection of an image onto the projection surface by the projection system.

7. The apparatus of claim 5, wherein the real reference frame points are cavities, the depths of which are greater than 0.5 mm.

8. The apparatus of claim 5, wherein the real reference frame points are cavities, the depths of which are greater than 1 mm.

9. The apparatus of claim 5, wherein the real reference frame points are bumps, the heights of which are greater than 0.5 mm.

10. The apparatus of claim 5, wherein the real reference frame points are bumps, the heights of which are greater than 1 mm.

11. A method for displaying an image onto a relief projection surface using a projection system, the method comprising setting the projection system to obtain and save a value of a setting parameter thereof, defining one of colors and textures for individual facets of a computer model defining the relief projection surface, constructing an image to be projected according to the computer model, to at least one of the colors and textures defined for the individual facets, and to the saved value for the setting parameter, and projecting the constructed image onto a projection surface of a three dimensional screen produced in a translucent material, the screen comprising a front face on which the projected image is displayed and a rear face forming the projection surface, wherein setting the projection system comprises automatically measuring, using a fixed camera, a distance separating virtual reference frame points projected onto the projection surface from real reference frame points produced on the three-dimensional screen, the method further comprising acquiring, using the fixed camera, an image of the rear face of the three-dimensional screen, identifying a position of a finger in contact with the front face of the three-dimensional screen in the acquired image, and controlling an appliance according to the identified position of the finger; wherein measuring the distance comprises acquiring a first acquired image of the real reference frame points using the fixed camera and identifying the real reference frame points in the first acquired image, acquiring a second acquired image of the virtual reference frame points projected onto the projection surface using the fixed camera and identifying the virtual reference frame points in the second acquired image, automatically associating each real point identified in the first acquired image with a corresponding virtual point identified in the second acquired image, and computing the distance separating the real points from the corresponding virtual points based at least in part on the coordinates of the real points in the first acquired image and the coordinates of the virtual points in the second acquired image.

12. The method of claim 11, wherein the setting parameter corresponds to the position of the computer model in a reference frame linked with no degree of freedom to the projector.

13. The method of claim 11, wherein the image constructed according to the computer model has no virtual reference frame points.

14. A non-transitory and tangible information storage medium comprising instructions for execution of a method according to claim 11, the instructions being configured for execution by an electronic computer.

15. A method for displaying an image onto a relief projection surface using a projection system, the method comprising setting the projection system to obtain and save a value of a setting parameter thereof, defining one of colors and textures for individual facets of a computer model defining the relief projection surface, constructing an image to be projected according to the computer model, to at least one of the colors and textures defined for the individual facets, and to the saved value for the setting parameter, and projecting the constructed image onto a projection surface of a three dimensional screen produced in a translucent material, the screen comprising a front face on which the projected image is displayed and a rear face forming the projection surface, wherein setting the projection system comprises automatically measuring, using a fixed camera, a distance separating virtual reference frame points projected onto the projection surface from real reference frame points produced on the three-dimensional screen, the method further comprising acquiring, using the fixed camera, an image of the rear face of the three-dimensional screen, identifying a position of a finger in contact with the front face of the three-dimensional screen in the acquired image, and controlling an appliance according to the identified position of the finger; the method further comprising repeatedly executing the steps of constructing the image according to the computer model, to at least one of the colors and textures defined for the individual facets, and of the value saved for the setting parameter, the constructed image also comprising the virtual reference frame points, projecting the constructed image, and setting the projection system on the basis of the projected constructed image so as to automatically adapt the projected image to a movement of the three-dimensional screen.

16. The method of claim 15, wherein the setting parameter corresponds to the position of the computer model in a reference frame linked with no degree of freedom to the projector.

17. A non-transitory and tangible information storage medium comprising instructions for execution of a method according to claim 15, the instructions being configured for execution by an electronic computer.

18. A method for displaying an image onto a relief projection surface using a projection system, the method comprising setting the projection system to obtain and save a value of a setting parameter thereof, defining one of colors and textures for individual facets of a computer model defining the relief projection surface, constructing an image to be projected according to the computer model, to at least one of the colors and textures defined for the individual facets, and to the saved value for the setting parameter, and projecting the constructed image onto a projection surface of a three dimensional screen produced in a translucent material, the screen comprising a front face on which the projected image is displayed and a rear face forming the projection surface, wherein setting the projection system comprises automatically measuring, using a fixed camera, a distance separating virtual reference frame points projected onto the projection surface from real reference frame points produced on the three-dimensional screen, the method further comprising acquiring, using the fixed camera, an image of the rear face of the three-dimensional screen, identifying a position of a finger in contact with the front face of the three-dimensional screen in the acquired image, and controlling an appliance according to the identified position of the finger; wherein setting the projection system comprises saving a computer model defining the relief projection surface and positions of at least four virtual reference frame points on the projection surface, producing the three-dimensional screen comprising the projection surface defined by the computer model and the real reference frame points fixed with no degree of freedom on the projection surface at the positions of the virtual reference frame points defined by the computer model, constructing an image containing the virtual reference frame points based at least in part on the computer model and a value chosen for the setting parameter of the projection system, using a projector, projecting the constructed image onto the projection surface, automatically measuring the distance separating, on the projection surface, the projected virtual reference frame points from the real reference frame points, if the measured distance is greater than a predetermined threshold, automatically modifying the value of the setting parameter to reduce the distance and reiteration of the constructing step, the projection step, the automatic measurement step, and the automatic modification step, and if the measured distance is less than the predetermined threshold, saving the value of the setting parameter for use in a subsequent projection of an image onto the projection surface; the method further comprising producing a mold based at least in part on the computer model of the projection surface, the mold comprising suction holes at each position of a virtual reference frame point, applying a plate of thermo-formable material to the mold by suction through the suction holes of air pockets present between the plate and the mold, and forming the real reference frame points by suction of the thermo-formable material into the suction holes.

19. The method of claim 18, wherein the setting parameter corresponds to the position of the computer model in a reference frame linked with no degree of freedom to the projector.

20. The method of claim 18, wherein the image constructed according to the computer model has no virtual reference frame points.

21. A non-transitory and tangible information storage medium comprising instructions for execution of a method according to claim 18, the instructions being configured for execution by an electronic computer.

* * * * *